Oct. 11, 1932.　　　R. C. HAIGHT　　　1,882,282

GRAPHIC DEVICE

Filed June 2, 1932

Inventor
R.C.Haight

By
Philip E. Liggers  Attorney

UNITED STATES PATENT OFFICE

REX C. HAIGHT, OF GRASS RANGE, MONTANA

GRAPHIC DEVICE

Application filed June 2, 1932. Serial No. 614,978.

This invention relates to graphic devices and aims, among other objects, to provide an improved device of this character constructed and arranged to be operated mechanically to facilitate the representation of numerical data.

In the accompanying drawing showing the preferred embodiment of the invention:—

Figure 1:
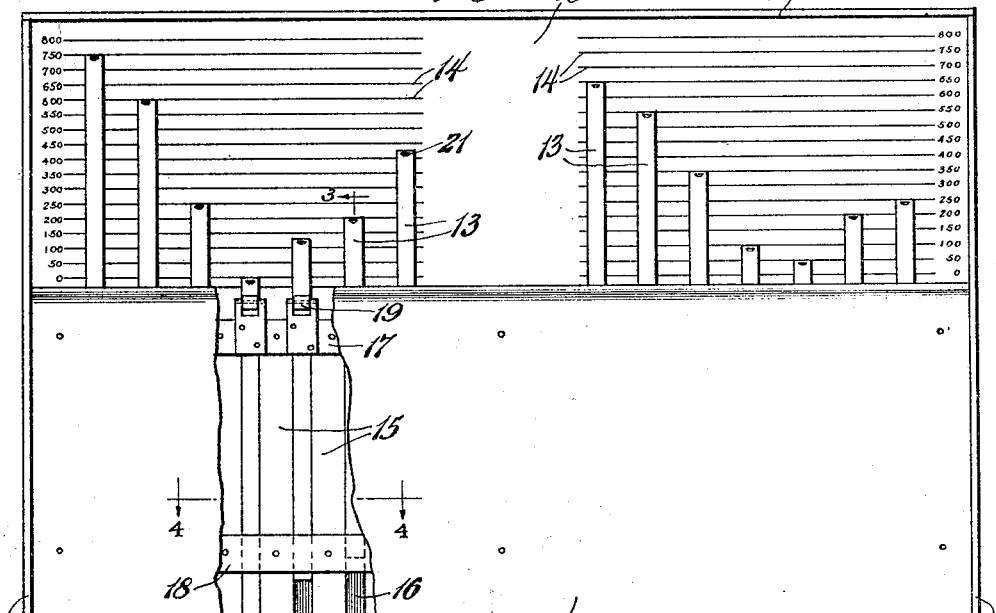
Fig. 1 is a front elevation of the device.

Referring particularly to the drawing, there is shown a casing comprising an upright backboard 10 having a marginal flange 11, and a front wall 12. The wall 12 extends upwardly from the bottom of the casing to a point substantially midway the height of the backboard so that the upper half of the board 10 is exposed. Mounted within the lower portion of the casing is a plurality of vertical slide members 13 constituting ordinates of the graph which are adapted to be raised to various heights according to the data to be portrayed. As herein shown, there are two sets of slides 13 and seven slides to each set, the slides in each set being evenly spaced and the sets being separated by a relatively wide space so that appropriate indicia may be placed in the space. To provide abscissas, the board is shown in Fig. 1 as having two sets of spaced horizontal lines 14 thereon forming scales with which the slides co-operate. Each line represents a certain numerical value, the value progressively increasing from the bottom to the top. The slides are adapted to be raised a predetermined height on the scales according to the data. The number of slides and lines; the number of series of each, and the arrangement of each can be varied, the combination here shown being merely illustrative.

Herein, the seven slides in the first series may represent the seven days of one week and the slide in the other series may represent the days of another week to be compared with the first week. For instance, the slide at the extreme left in left hand series may represent 750 carloads of merchandise shipped on Monday of one week and the slide at the left of the right hand series may represent 650 carloads shipped on Monday of another week.

In order to mount the slides for vertical sliding movement, spaced blocks 15 are secured on the backboard to provide channels 16 of substantially the same width as the slides. The thickness of the slides and blocks are substantially the same, so that the slides may be held in the channels by upper and lower horizontal retainer bars 17 and 18 extending across the faces of the blocks and the slides and secured to the blocks. In order to hold the slides in vertically adjusted positions, a spring device is herein shown associated with each slide. Each device as here shown comprises a roller 19 carried by a spring metal plate 20 which is secured to the upper retainer bar 17. The tension of the plate causes the roller to frictionally hold the slide against the backboard. Each slide 13 is provided at its upper end with a notch 21 so that the slide may be raised conveniently. The front wall 12 is secured to the bars 17 and 18 and covers all of the mechanism in the lower part of the casing, only the slides 13 being visible when they are raised. When in normal position, the lower ends of the slides rest on the bottom flange 11 and their upper ends project slightly above the front wall so that they may be engaged to be raised. When in normal position the upper edges of the slides coincide with the zero lines 14 on the scales.

If the graph is to be used in plotting curves, the left hand marginal flange and the top of the wall 12 could represent the coordinate axes of the graph and the distance between the lines 14 and between slides 13 would be made to suit the convenience of the user. The face of the board could be painted black and the lines white so that the curves would be laid out in chalk.

Figure 2:
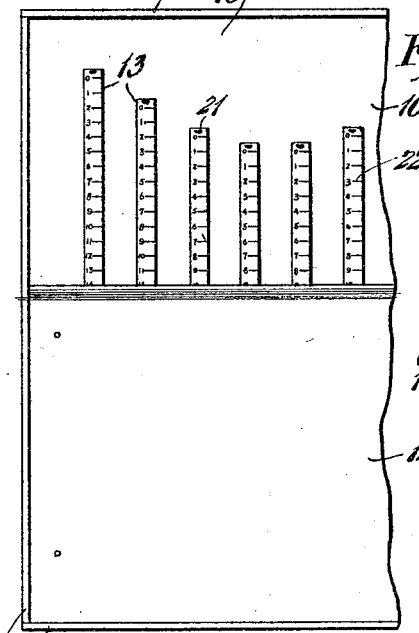
Fig. 2 is a partial front elevation of the device showing a slightly modified form.
Figure 4:
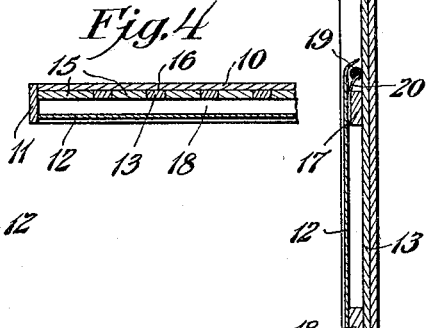
Fig. 4 is a fragmentary sectional view taken on line 4—4 of Fig. 1.
Figure 3:
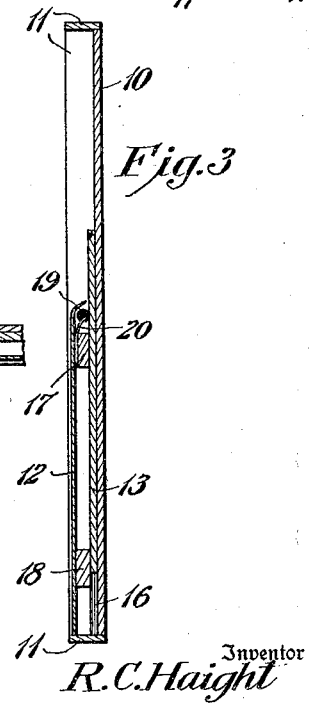
Fig. 3 is a sectional view taken on line 3—3 of Fig. 1.

In the modification shown in Fig. 2, the construction is the same as that shown in Fig. 1 with the exception that the graduation lines are placed on the slides 13, as indicated at 22, instead of on the board 10. In applying the graduation in this manner they increase progressively from top to bottom so that values are gauged from the upper edge of the front wall. For convenience, the upper end of the wall 12 is bent inwardly at an angle so that the edge is close to the slides 13 and serves as a pointer.

The device may be constructed very cheaply and can be used for various purposes. A teacher may quickly arrange slides to show graphically any factual material and display the graph to the classroom for instructional purposes. Students may be assigned studies in statistical material which may quickly and effectively be portrayed on the device. Photographs of studies worked out on the device may be taken and cuts made therefrom for prints. It might also be used for any public display where matter of a factual or statistical nature is to be presented, such as displays in banks, brokerage houses, etc.

Obviously, the present invention is not restricted to the particular embodiment thereof herein shown and described. Moreover, it is not indispensable that all the features of the invention be used conjointly, since they may be employed advantageously in various combinations and subcombinations.

What I claim is:—

1. A mechanical graph comprising, in combination, an upright backboard having a plane surface and a marginal front flange; a front wall spaced from the backboard and extending from the bottom to substantially midway the height thereof; the backboard having a scale thereon above the front wall; vertical slide members mounted behind the front wall and adapted to be raised to indicate vertical distances on the scale; guide means behind the front wall for the slide members; means to retain the slide members in the guide means; and means to hold the slide members in adjusted positions.

2. A mechanical graph comprising, in combination, an upright backboard having a plane surface; a plurality of spaced vertical members slidable on the backboard and adapted to constitute ordinates; and means to hold the slidable members against the backboard in vertically adjusted positions.

3. A mechanical graph comprising, in combination, an upright backboard having a plane surface; a plurality of spaced vertical members slidable on the backboard and adapted to constitute ordinates; and springs to hold the slidable members against the backboard in vertically adjusted positions.

In testimony, that I claim the foregoing as my own, I have hereto affixed my signature.

REX C. HAIGHT.